(12) United States Patent
Tsai et al.

(10) Patent No.: US 11,552,315 B2
(45) Date of Patent: Jan. 10, 2023

(54) CONTROL SYSTEM AND METHOD OF FUEL CELL STACKS

(71) Applicant: Industrial Technology Research Institute, Hsinchu (TW)

(72) Inventors: Yin-Wen Tsai, Hsinchu County (TW); Chih-Wei Hsu, Hsinchu County (TW); Ku-Yen Kang, Hsinchu County (TW); Yuh-Fwu Chou, Hsinchu County (TW); Chin-Yi Shih, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/229,877

(22) Filed: Apr. 14, 2021

(65) Prior Publication Data

US 2022/0209262 A1 Jun. 30, 2022

(30) Foreign Application Priority Data

Dec. 31, 2020 (TW) .................. 109147052

(51) Int. Cl.
*H01M 8/04* (2016.01)
*H01M 8/04537* (2016.01)
*H01M 8/249* (2016.01)

(52) U.S. Cl.
CPC ... *H01M 8/04619* (2013.01); *H01M 8/04559* (2013.01); *H01M 8/04589* (2013.01); *H01M 8/249* (2013.01)

(58) Field of Classification Search
CPC ......... H01M 8/04619; H01M 8/04559; H01M 8/04589; H01M 8/249
See application file for complete search history.

(56) References Cited

U.S. PATENT DOCUMENTS

| 7,821,225 B2 | 10/2010 | Chou et al. |
| 2004/0175598 A1* | 9/2004 | Bliven ............... H02J 7/34 |
| | | 429/432 |

(Continued)

FOREIGN PATENT DOCUMENTS

| CN | 107244326 | 10/2017 |
| CN | 108407632 | 8/2018 |

(Continued)

OTHER PUBLICATIONS

"Partial Supplementary Search Report of Europe Counterpart Application", dated Oct. 26, 2021, p. 1-p. 11.

(Continued)

*Primary Examiner* — Olatunji A Godo
(74) *Attorney, Agent, or Firm* — JCIPRNET

(57) ABSTRACT

A control system and a control method of fuel cell stacks are provided. The control system includes a set of fuel cell stacks, a secondary battery, a monitoring device, and a control device. Each fuel cell stack has a power output that can be independently started up or shut down. The secondary battery is connected to power output terminals of the fuel cell stacks via a power transmission path. The monitoring device is configured to monitor an electrical parameter of the power transmission path. The control device receives an electrical parameter signal from the monitoring device, and outputs a control signal to shut down or start up the power output of at least one of the fuel cell stacks if the electrical parameter's value is higher than a predetermined upper limit or lower than a predetermined lower limit.

34 Claims, 12 Drawing Sheets

(56) References Cited

U.S. PATENT DOCUMENTS

| | | |
|---|---|---|
| 2005/0112420 A1 | 5/2005 | Lai et al. |
| 2006/0284614 A1 | 12/2006 | Kim et al. |
| 2008/0075988 A1 | 3/2008 | Suzuki et al. |
| 2009/0155633 A1 | 6/2009 | Dong et al. |
| 2011/0065012 A1* | 3/2011 | Kwon ................ H01M 16/006 429/429 |
| 2011/0071706 A1 | 3/2011 | Crumm et al. |
| 2011/0200906 A1 | 8/2011 | Wu et al. |
| 2013/0071698 A1 | 3/2013 | Yemul et al. |
| 2019/0006689 A1 | 1/2019 | Nada |
| 2019/0204836 A1 | 7/2019 | Rezvani |
| 2019/0275912 A1 | 9/2019 | Tsuruta |
| 2020/0083550 A1 | 3/2020 | Chou et al. |

FOREIGN PATENT DOCUMENTS

| | | |
|---|---|---|
| CN | 110112440 | 8/2019 |
| CN | 110816313 | 2/2020 |
| CN | 110858657 | 3/2020 |
| CN | 111211343 | 5/2020 |
| TW | 200633342 | 9/2006 |
| TW | 200701609 | 1/2007 |
| TW | I364128 | 5/2012 |
| TW | I619644 | 4/2018 |
| WO | 2016059390 | 4/2016 |
| WO | 2019103388 | 5/2019 |

OTHER PUBLICATIONS

"Office Action of Taiwan Counterpart Application", dated Nov. 29, 2021, p. 1-p. 11.

"Search Report of Europe Counterpart Application", dated Mar. 18, 2022, p. 1-p. 14.

"Office Action of Taiwan Counterpart Application", dated Aug. 17, 2022, p. 1-p. 5.

* cited by examiner

CONTROL SYSTEM AND METHOD OF FUEL CELL STACKS

CROSS-REFERENCE TO RELATED APPLICATION

This application claims the priority benefit of Taiwan application serial no. 109147052, filed on Dec. 31, 2020. The entirety of the above-mentioned patent application is hereby incorporated by reference herein and made a part of this specification.

TECHNICAL FIELD

The technical field relates to a control system and method of fuel cell stacks.

BACKGROUND

In a fuel cell-based power supply system, by directly supplying a load with demanded electric power, not only energy loss through a power converter can be reduced, but also the burden of thermal management can be eased. In the case of using the power supply system in a DC power system of an unmanned aerial vehicle (UAV), energy density may be significantly increased. However, in such a power supply method, an output voltage of the fuel cell varies greatly with the electric power demand of the load and may exceed an input voltage range of the load. Particularly, depending on different UAV payloads, the electric power demand may vary greatly, making it difficult to maintain the output voltage of the fuel cell within a desired range.

In the power supply system in which the fuel cell directly supplies the demanded electric power to the load, a key factor in maintaining a load voltage within an expected range is control of output power of the fuel cell. As one method, the output power is dynamically adjusted in accordance with a variation in the demand of the load by individual start-up and shutdown of power supply of a multi-module stack.

Nonetheless, techniques for instantly adjusting the number of stacks for power supply in response to a load variation and easing the burden associated with a load power demand on a secondary battery during start-up or shutdown of a fuel cell while ensuring smooth power supply have been under research.

SUMMARY

One of exemplary embodiments provides a control system of a fuel cell stack. The control system includes a set of fuel cell stacks, a secondary battery, a monitoring device, and a control device. Each fuel cell stack has a power output independently started up or shut down, and power output terminals of the set of fuel cell stacks are connected in parallel to a load terminal for power supply. The secondary battery is connected to the power output terminals of the set of fuel cell stacks via a power transmission path. The monitoring device is configured to monitor an electrical parameter of the power transmission path. The control device receives a signal of the electrical parameter from the monitoring device, outputs a first control signal to shut down the power output of at least one fuel cell stack of the set of fuel cell stacks in response to a value of the electrical parameter being higher than a predetermined upper limit, and outputs a second control signal to start up the power output of at least one fuel cell stack of the set of fuel cell stacks in response to the value of the electrical parameter being lower than a predetermined lower limit.

One of exemplary embodiments provides a control method of a fuel cell stack. The control method is configured to control a set of fuel cell stacks in which each fuel cell stack has a power output independently started up or shut down, and power output terminals of the set of fuel cell stacks are connected in parallel to a load terminal for power supply. The control method includes the following. A secondary battery is connected to the power output terminals of the set of fuel cell stacks via a power transmission path. An electrical parameter of the power transmission path is monitored by a monitoring device. The electrical parameter is received by a control device, and one of the following is performed according to the electrical parameter by the control device. A first control signal is output to shut down the power output of at least one fuel cell stack of the set of fuel cell stacks in response to a value of the electrical parameter being higher than a predetermined upper limit. A second control signal is output to start up the power output of at least one fuel cell stack of the set of fuel cell stacks in response to the value of the electrical parameter being lower than a predetermined lower limit.

Several exemplary embodiments accompanied with figures are described in detail below to further describe the disclosure in details.

DETAILED DESCRIPTION OF DISCLOSED EMBODIMENTS

Figure 1A:
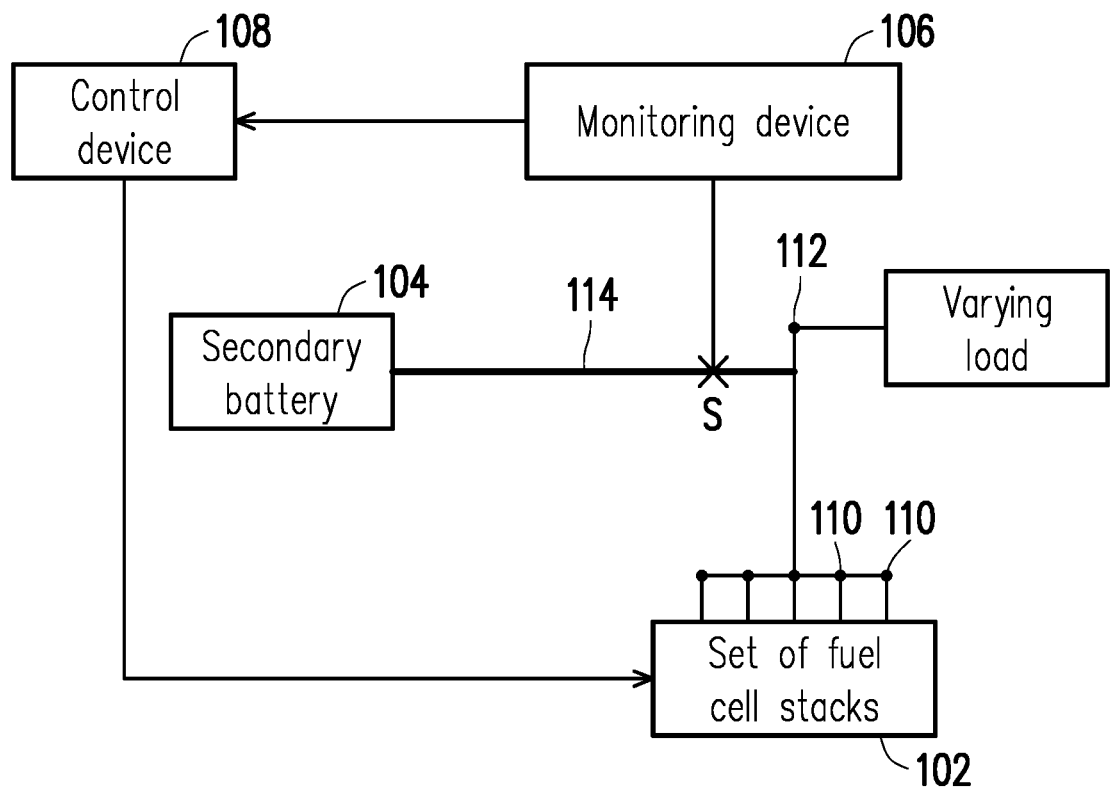
FIG. 1A is a block diagram of a control system of a fuel cell stack according to a first exemplary embodiment.

FIG. 1A is a block diagram of a control system of a fuel cell stack according to a first exemplary embodiment.

Referring to FIG. 1A, a fuel cell stack control system 100 of the exemplary embodiment includes a set of fuel cell stacks 102, a secondary battery 104, a monitoring device 106, and a control device 108. Each fuel cell stack of the set of fuel cell stacks 102 has a power output independently started up or shut down, and power output terminals 110 of the set of fuel cell stacks 102 are connected in parallel to a load terminal 112 to supply electric power to a varying load. The secondary battery 104 is connected to the power output terminals 110 of the set of fuel cell stacks 102 via a power transmission path 114. The secondary battery 104 may provide demanded auxiliary electric power or receive surplus electric power remaining in the set of fuel cell stacks 102 for charging after electric power is supplied to the varying load. The monitoring device 106 is configured to monitor an electrical parameter S of the power transmission path 114. The power transmission path 114 refers to a path between the secondary battery 104 and the power output terminals 110. Depending on different monitoring devices or conditions, the electrical parameter S may include power $P_{in}$ input to the secondary battery 104, a state of charge (SOC) of the secondary battery 104, an output terminal voltage $V_{Batt}$ of the secondary battery 104, a current $I_{in}$ input to the secondary battery 104, an output voltage $V_{FC}$ of the set of fuel cell stacks 102, and so on. After receiving the electrical parameter S, the control device 108 outputs a first control signal to shut down the power output of at least one fuel cell stack of the set of fuel cell stacks 102 if a value of the electrical parameter S is higher than a predetermined upper limit $S_1$, or outputs a second control signal to start up the power output of at least one fuel cell stack of the set of fuel cell stacks 102 if the value of the electrical parameter S is lower than a predetermined lower limit $S_2$. In one exemplary embodiment, the secondary battery 104 is, for example, a lithium battery (such as a lithium polymer (Li-Po) battery, a lithium-ion (Li-ion) battery or a solid-state electrolyte lithium battery) or other high-power rechargeable battery (such as a lead-acid battery, a nickel-cadmium (NiCd) battery, a nickel-metal hydride (NiMH) battery, or an electric double-layer capacitor (EDLC)). Depending on the electrical parameter S to be monitored, the monitoring device 106 may include but not limited to, various power monitoring instruments such as a voltage detector, a voltage power detector, a current detector, a power meter, a watt-hour meter, or an SOC estimator. The control device 108 is, for example, a processor or a computer.

Figure 1B:
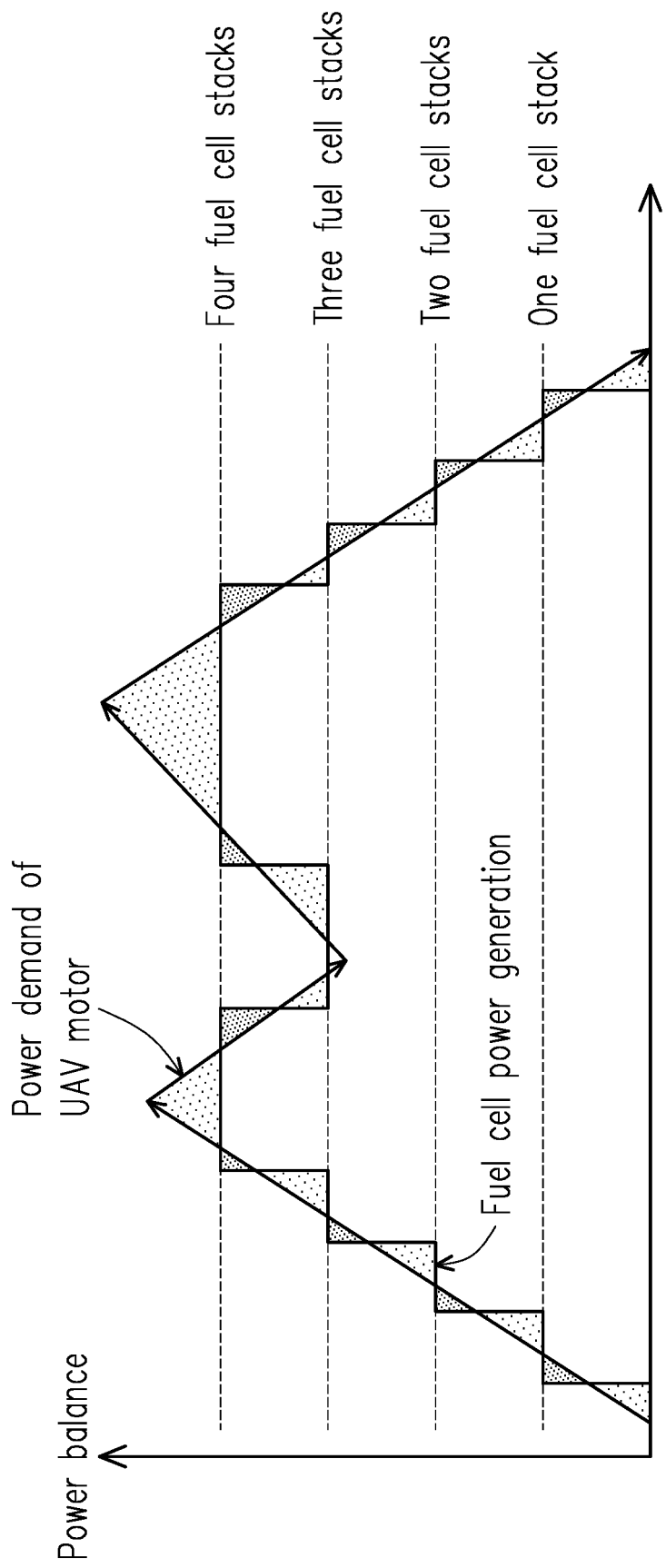
FIG. 1B is a curve diagram of an electric power demand of a UAV.

In one exemplary embodiment, the varying load is, for example, a device varying greatly in load, such as a UAV. For example, as shown in FIG. 1B, as time changes, while a power demand of the UAV is rising linearly, output power of the set of fuel cell stacks 102 increases stepwise (fuel cell power generation), so as to meet the electric power demand of the UAV. The electrical parameter S (such as output/input power) of the power transmission path 114 is as shown by dense point distribution blocks and sparse point distribution blocks in FIG. 1B. The dense point distribution blocks indicate the magnitude of charge power (at this time, since the output power of the set of fuel cell stacks 102 is greater than the electric power demand of the UAV, surplus power is provided for charging the secondary battery 104). The sparse point distribution blocks indicate the magnitude of discharge power (at this time, since the output power of the set of fuel cell stacks 102 is less than the electric power demand of the UAV, insufficient power is provided by discharging the secondary battery 104). Thus, in response to a variation in the motor load power demand of the UAV, the power outputs of the set of fuel cell stacks 102 are started up one by one according to the electrical parameter S. In a downwind/upwind situation, or a deceleration/acceleration situation, or a situation where a flight altitude changes, the motor load power of the UAV may differ. Accordingly, by the control system and method according to one exemplary embodiment, some fuel cell stacks of the set of fuel cell stacks 102 can be instantly started up or shut down in response to a load variation.

Figure 1C:
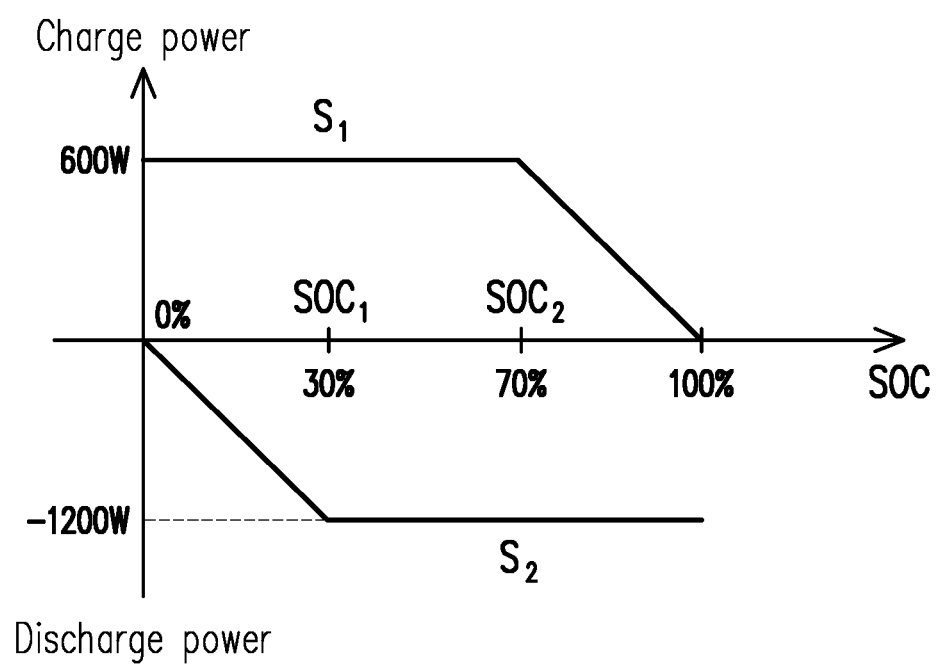
FIG. 1C is a curve diagram showing variations in upper and lower limits of power with a state of charge (SOC) in the first exemplary embodiment.

In one exemplary embodiment, referring to FIG. 1A and FIG. 1C, the electrical parameter S is the power (charge power) $P_{in}$ input to the secondary battery 104. The predetermined upper limit $S^1$ is a (charge) power upper limit, and the predetermined lower limit $S_2$ is a (discharge) power lower limit. Therefore, the charge power is positive ($S_1 > 0$), and the discharge power is negative ($S_{2<0}$). Further, a state of charge SOC of the secondary battery 104 can be estimated by the monitoring device 106. When the state of charge SOC is greater than a state of charge upper limit $SOC_2$, the aforementioned power upper limit is lowered; when the state of charge SOC is less than a state of charge lower limit $SOC_1$, the aforementioned power lower limit is raised. For example, as shown in FIG. 1C, $S_1$ is originally set to 600 W. Once the SOC is greater than the state of charge upper limit $SOC_2$ (for example, 70%), $S_1$ is linearly lowered from 600 W. That is, the charge power upper limit $S_1$ is equal to 400 W when the SOC is 80%, $S^1$ is equal to 200 W when the SOC is 90%, and $S_1$ is equal to 0 W when the SOC is 100%. Similarly, assuming that the discharge power lower limit $S_2$ is originally set to −1200 W, once the SOC is less than the state of charge lower limit $SOC_1$ (for example, 30%), $S_2$ is linearly raised from −1200 W. That is, $S_2$ is equal to −800 W when the SOC is 20%, $S_2$ is equal to −400 W when the SOC is 10%, and $S_2$ is equal to 0 W when the SOC is 0%. Therefore, in the case where the electrical parameter S is the power (charge power) $P_{in}$ input to the secondary battery 104, the predetermined charge power upper limit $S_1$ and the predetermined discharge power lower limit $S_2$ may be maintained at fixed values or may be adjusted according to the SOC. The state of charge SOC of the secondary battery 104 may be determined according to the output terminal voltage of the secondary battery 104 in the power transmission path 114, or may be estimated from the output terminal voltage of the secondary battery 104 in the power transmission path 114 and a quantity of electricity entering and leaving the secondary battery 104 via the power transmission path 114, as disclosed in, for example, an estimation method of TW 1337413.

In another exemplary embodiment, the electrical parameter S is the state of charge SOC of the secondary battery 104. The predetermined upper limit $S_1$ is the state of charge upper limit, the predetermined lower limit $S_2$ is the state of charge lower limit, and therefore, both $S_1$ and $S_2$ are greater than 0. The state of charge of the secondary battery 104 has been described in the preceding paragraphs and will not be described again.

Figure 1D:
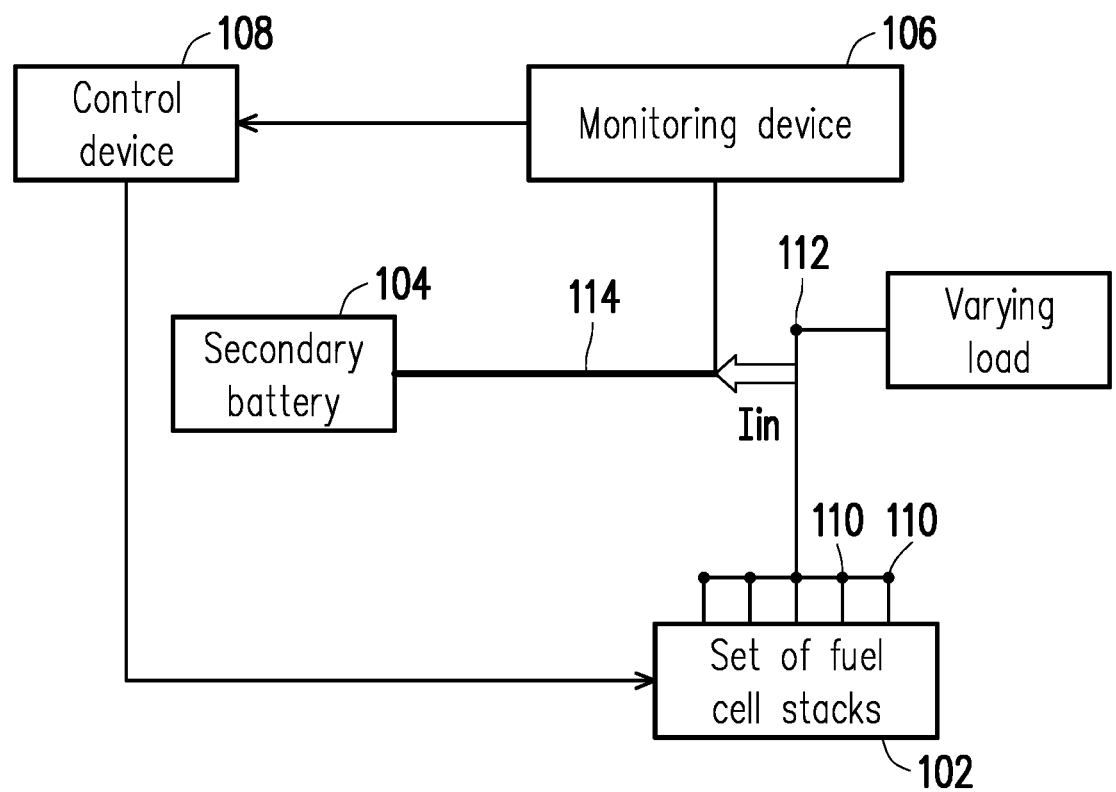
FIG. 1D is a block diagram of another control system of a fuel cell stack according to the first exemplary embodiment.

In still another exemplary embodiment, referring to FIG. 1D, the electrical parameter S may be the current $I_{in}$ input to the secondary battery 104, the predetermined upper limit $S_1$ is an input current upper limit, the predetermined lower limit $S_2$ is an input current lower limit, $S_1$ is greater than 0 and $S_2$ is less than 0. When the secondary battery 104 receives a current from the power transmission path 114, the value of S is greater than 0; when the secondary battery 104 outputs a current via the power transmission path 114, the value of S is less than 0. Further, the state of charge SOC of the secondary battery 104 may be estimated through the monitoring device 106, as in the curve variations shown in FIG. 1C. That is, the charge power and the discharge power in FIG. 1C are changed to charge current and discharge current, respectively. Accordingly, when the state of charge SOC is greater than the state of charge upper limit $SOC_2$, the input current upper limit $S_1$ is lowered; when the state of charge SOC is less than the state of charge lower limit $SOC_1$, the input current lower limit $S_2$ is raised.

Figure 1E:
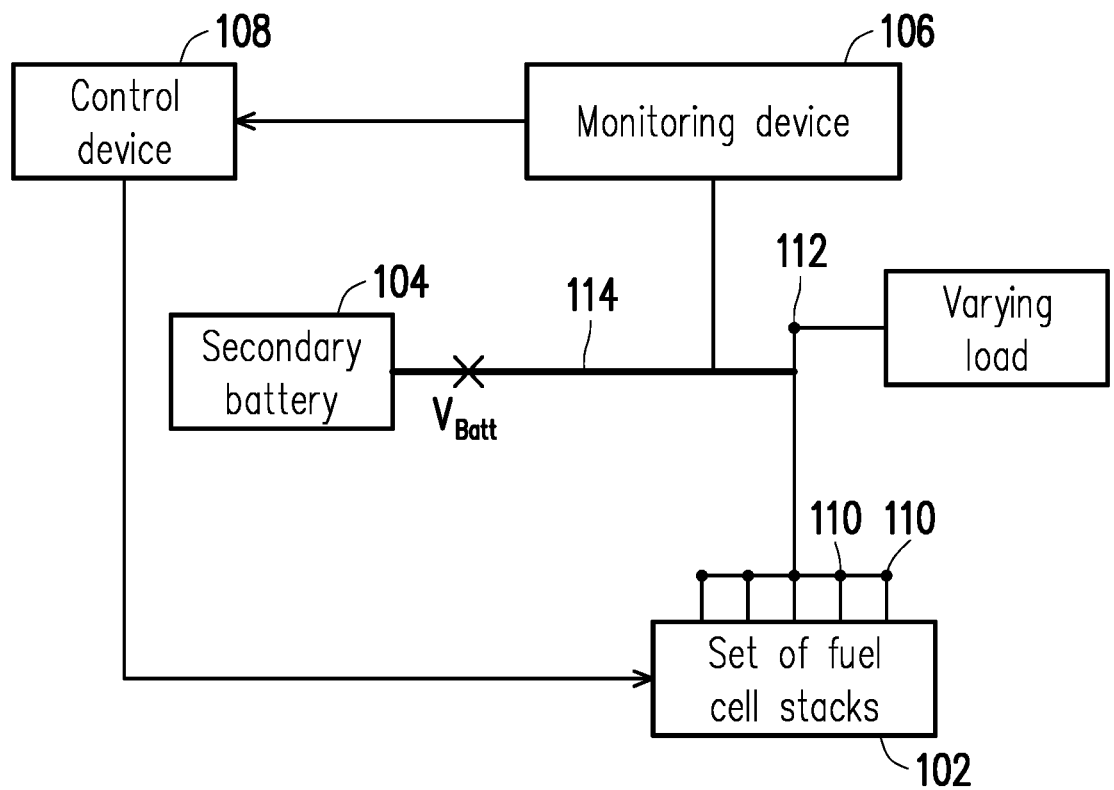
FIG. 1E is a block diagram of still another control system of a fuel cell stack according to the first exemplary embodiment.

In yet still another exemplary embodiment, referring to FIG. 1E, the electrical parameter S is the output terminal voltage $V_{Batt}$ output by the secondary battery 104 to the (varying) load, the predetermined upper limit $S_1$ is a terminal voltage upper limit $V_H$, and the predetermined lower limit $S_2$ is a terminal voltage lower limit $V_L$.

Figure 2:
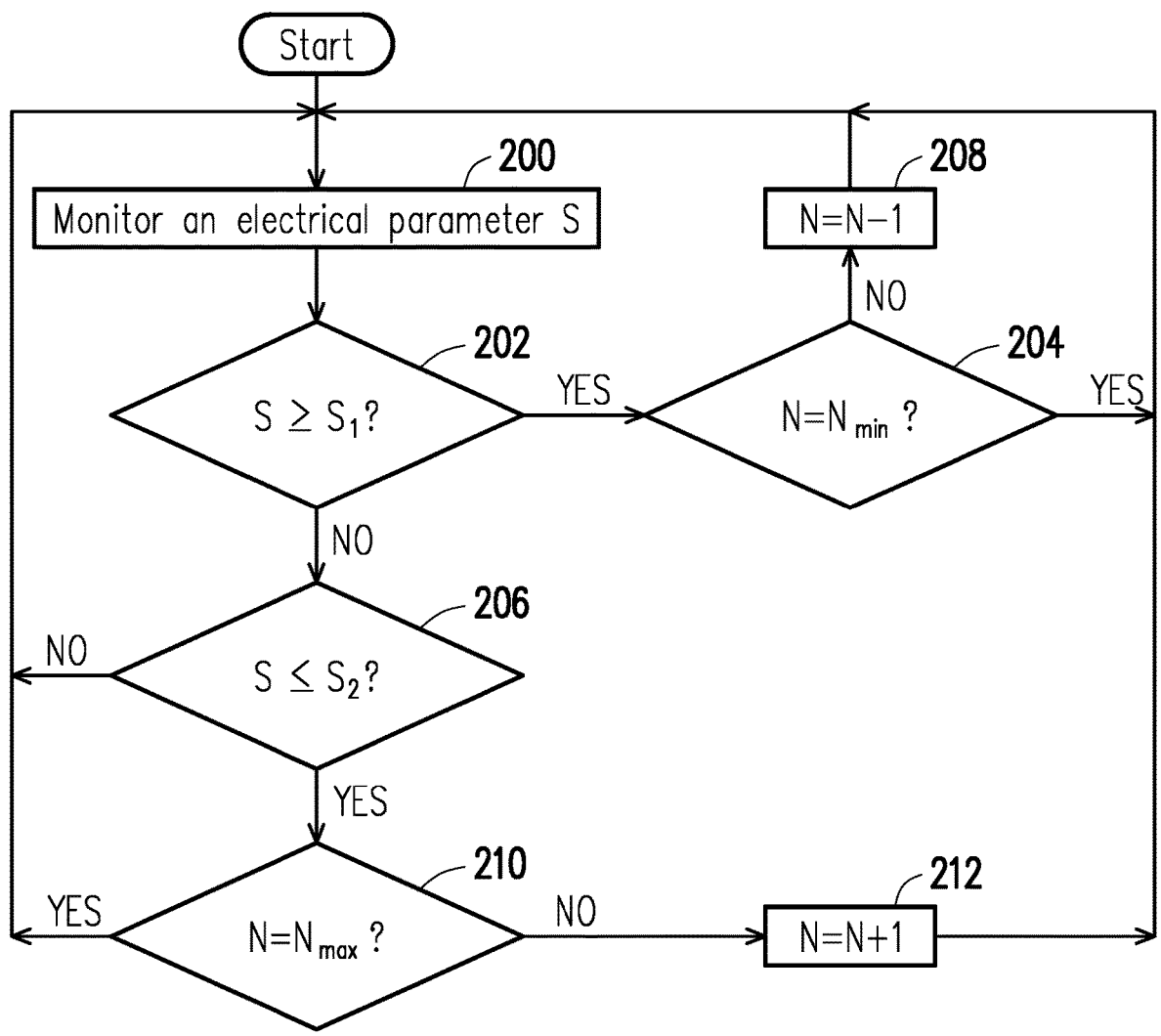
FIG. 2 shows steps of a control method of a fuel cell stack according to the first exemplary embodiment.

FIG. 2 shows steps of a control method of a fuel cell stack according to the first exemplary embodiment. The control system can be understood with reference to the above description of the first exemplary embodiment and will not be described again.

Referring to FIG. 2, in step 200, the electrical parameter S of a power transmission path (114 in FIG. 1) is monitored by a monitoring device (106 in FIG. 1). S may be the power $P_{in}$ input to the secondary battery 104, the state of charge (SOC) of the secondary battery 104, the output terminal voltage $V_{Batt}$ of the secondary battery 104, the current $I_{in}$ input to the secondary battery 104, or the output voltage $V_{FC}$ of the set of fuel cell stacks 102.

When S is the power $P_{in}$ input to the secondary battery 104, the predetermined upper limit $S_1$ is the (charge) power upper limit, and the predetermined lower limit $S_2$ is the (discharge) power lower limit.

When S is the state of charge (SOC) of the secondary battery 104, the predetermined upper limit $S_1$ is the state of charge upper limit, and the predetermined lower limit $S_2$ is the state of charge lower limit.

When S is the current $I_{in}$ input to the secondary battery 104, the predetermined upper limit $S_1$ is the input current upper limit, and the predetermined lower limit $S_2$ is the input current lower limit.

When S is the output terminal voltage $V_{Batt}$ of the secondary battery 104, the predetermined upper limit $S_1$ is the terminal voltage upper limit, and the predetermined lower limit $S_2$ is the terminal voltage lower limit.

When S is the output voltage $V_{FC}$ of the set of fuel cell stacks 102, the predetermined upper limit $S_1$ is an output voltage upper limit of the set of fuel cell stacks 102, and the predetermined lower limit $S_2$ is an output voltage lower limit of the set of fuel cell stacks 102.

Then, the electrical parameter S is received by a control device (108 in FIG. 1), and whether the electrical parameter S is greater than or equal to the predetermined upper limit $S_1$ is first determined (step 202). If S is greater than or equal to $S_1$, step 204 is performed; if S is less than $S_1$, step 206 is performed.

In step 204, whether a number N of fuel cell stacks currently on is equal to a minimum number $N_{min}$ is determined. If N is equal to $N_{min}$, the process returns to step 200. If N is not equal to $N_{min}$, the control device (108 in FIG. 1) outputs the first control signal to shut down (turn off) the power output of one of the fuel cell stacks (step 208).

In step 206, whether the electrical parameter S is less than or equal to the predetermined lower limit $S_2$ is determined. If S is less than or equal to $S_2$, step 210 is performed; if S is greater than $S_2$, the process returns to step 200.

In step 210, whether the number N of fuel cell stacks currently on is equal to a maximum number $N_{max}$ is determined. If N is equal to $N_{max}$, the process returns to step 200. If N is not equal to $N_{max}$, the control device (108 in FIG. 1) outputs the second control signal to start up (turn on) the power output of one of the fuel cell stacks (step 212).

Whether step 212 or step 208 is performed, the process will then return to step 200 to continuously monitor the electrical parameter S. Therefore, in response to a load variation, power generation of some of the fuel cell stacks connected in parallel can be instantly started up or shut down, such that the output voltage of the set of fuel cell stacks (102 in FIG. 1) operating in parallel can be controlled within an expected specific range. Particularly, the electrical parameter S under monitoring is a value directly related to the secondary battery (104 in FIG. 1). Thus, in the exemplary embodiment, there is no need to monitor the state of the load or the fuel cell stacks. Simply by monitoring a power output state of the secondary battery, the output power of the fuel cell stacks can be controlled, so that the discharge power or charge power of the secondary battery can be controlled within an appropriate range.

Figure 3:
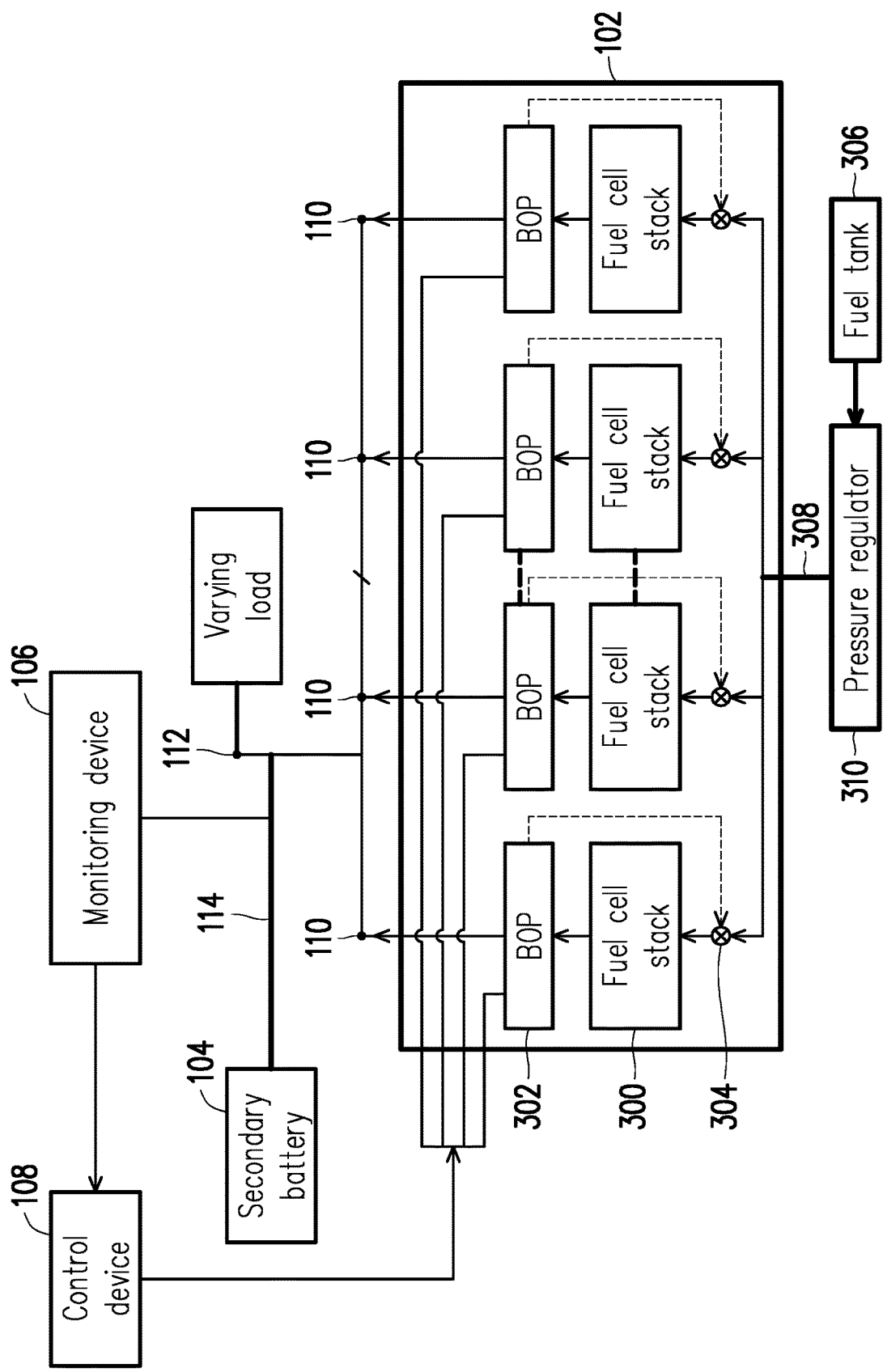
FIG. 3 is a block diagram of a specific example of a control system of a fuel cell stack according to the first exemplary embodiment.

FIG. 3 is a block diagram of a specific example of a control system of a fuel cell stack according to the first exemplary embodiment. The same reference numerals as those in FIG. 1 denote the same or similar members, and the same or similar members can be understood with reference to the description of FIG. 1 and will not be described again.

Referring to FIG. 3, the set of fuel cell stacks 102 may include multiple fuel cell stacks 300, and each fuel cell stack 300 is equipped with a balance of plant (BOP) device 302 which controls a switch of an intake valve 304. Since the intake valve 304 communicates with a fuel tank 306, closing one intake valve 304 means shutting down the power output of one of the fuel cell stacks 300, and opening one intake valve 304 means starting up the power output of one of the fuel cell stacks 300. Although FIG. 3 shows four fuel cell stacks 300, it will be understood that the number of the fuel cell stacks 300 in the set of fuel cell stacks 102 of the exemplary embodiment may be increased or decreased as needed. In addition, a pressure regulator 310 may be disposed in a gas fuel supply pipe 308 between the intake valve 304 and the fuel tank 306 to control the pressure of a gas entering the fuel cell stack 300. The pressure regulator 310 is, for example, a pressure reducing valve.

In FIG. 3, a power output path of the set of fuel cell stacks 102 is from each fuel cell stack 300 to each BOP device 302 and then to each power output terminal 110. Upon receiving the electrical parameter S measured by the monitoring device 106, the control device 108 performs the steps as shown in FIG. 2 and outputs a control signal to each BOP device 302 to either start up or shut down one of the fuel cell stacks 300 connected in parallel.

Figure 4:
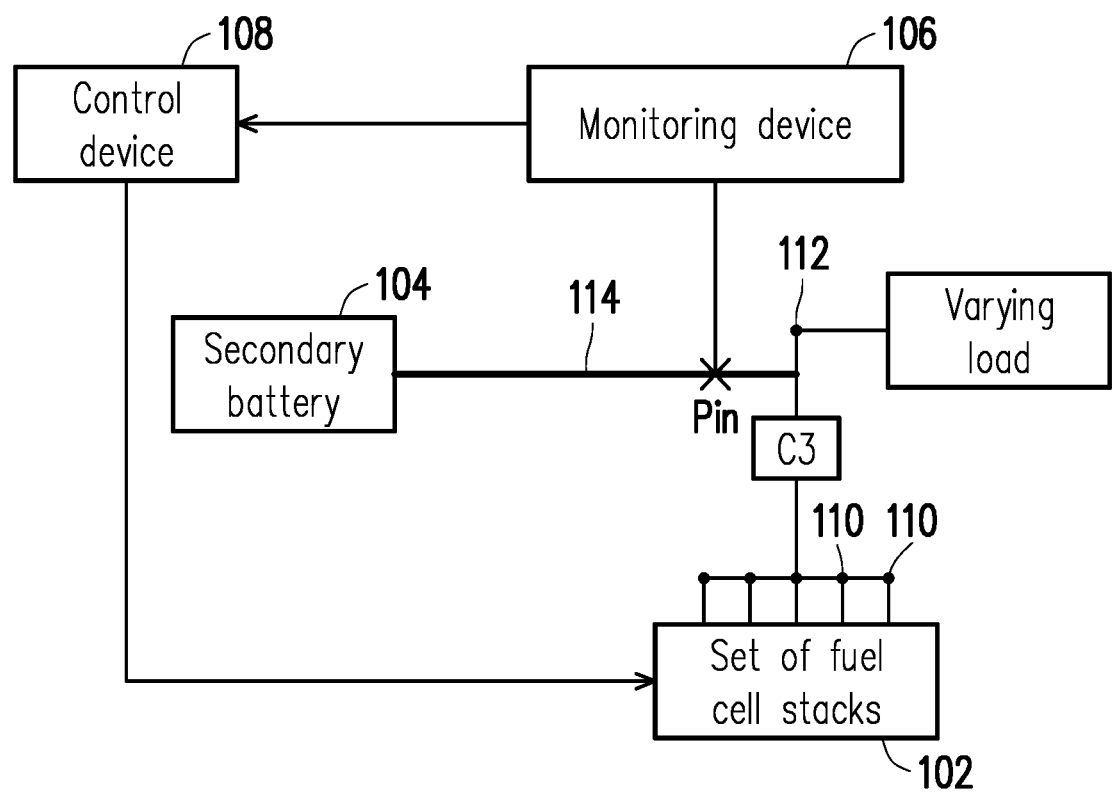
FIG. 4 is a block diagram of a control system of a fuel cell stack according to a second exemplary embodiment.

FIG. 4 is a block diagram of a control system of a fuel cell stack according to a second exemplary embodiment. The same reference numerals as those in the first exemplary embodiment denote the same or similar members, and the same or similar members can be understood with reference to the description of the first exemplary embodiment and will not be described again.

Referring to FIG. 4, the control system of a fuel cell stack according to the exemplary embodiment differs from the first exemplary embodiment in that the electrical parameter S of the second exemplary embodiment is the power (charge power) $P_{in}$ input to the secondary battery 104. Thus, the predetermined upper limit $S_1$ is the (charge) power upper limit, and the predetermined lower limit $S_2$ is the (discharge) power lower limit. Therefore, the charge power is positive ($S_1>0$), and the discharge power is negative ($S_2<0$). The fuel cell stack control system 100 of the exemplary embodiment further includes a third DC voltage converter C3 disposed between the power output terminals 110 of the set of fuel cell stacks 102 and the load terminal 112, so that power is output to the load terminal 112 via the third DC voltage converter C3. For example, in the case where the varying load is a UAV motor having a working voltage of 42V to 55V, a predetermined output voltage $V_{out}$ of the third DC voltage converter C3 may be set within the above range to ensure that a terminal voltage output from the load terminal 112 matches the working voltage of the UAV motor, wherein insufficient power output would be supplemented by the secondary battery 104 via the power transmission path 114 to the load terminal 112, or the secondary battery 104 absorbs excessive power output via the power transmission path 114.

Figure 5:
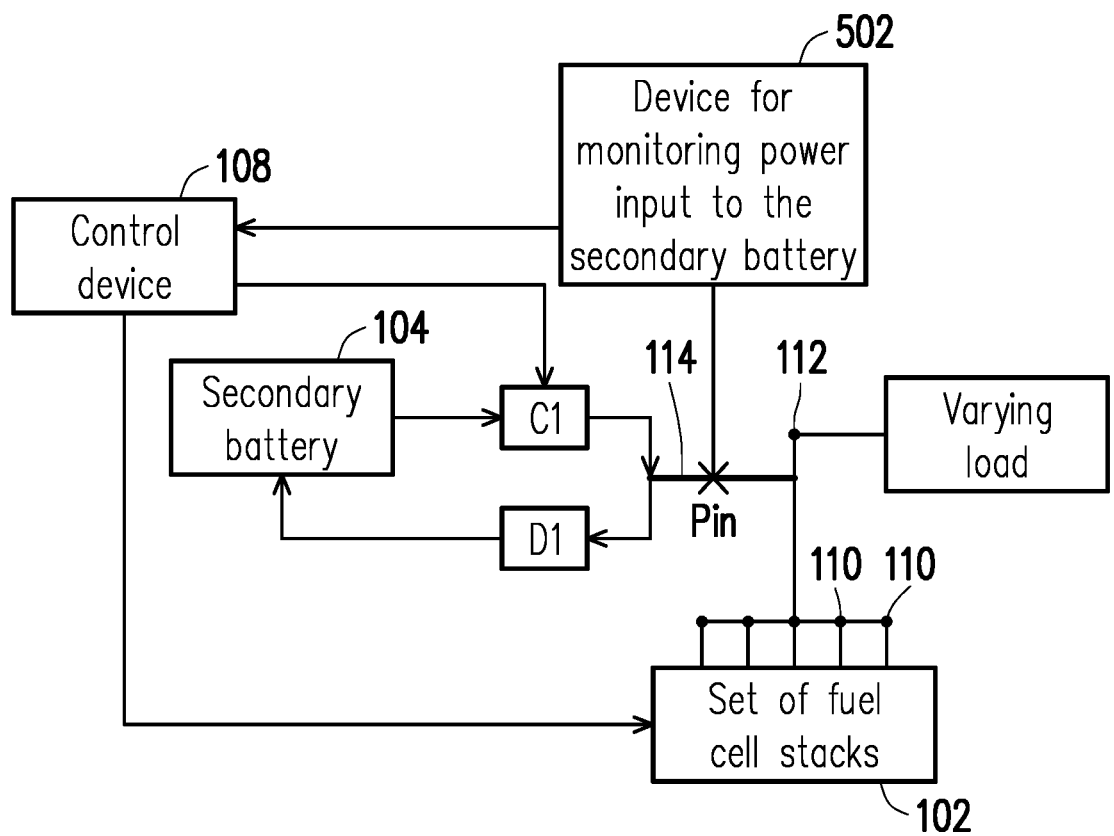
FIG. 5 is a block diagram of a control system of a fuel cell stack according to a third exemplary embodiment.

FIG. 5 is a block diagram of a control system of a fuel cell stack according to a third exemplary embodiment. The same reference numerals as those in the first exemplary embodiment denote the same or similar members, and the same or similar members can be understood with reference to the description of the first exemplary embodiment and will not be described again.

Referring to FIG. 5, the electrical parameter S of the control system of a fuel cell stack according to the exemplary embodiment is the power (charge power) $P_{in}$ input to the secondary battery 104. Thus, the predetermined upper limit $S_1$ is the (charge) power upper limit, and the predetermined lower limit $S_2$ is the (discharge) power lower limit. Therefore, the charge power is positive ($S_1$>0), and the discharge power is negative ($S_2$<0). The exemplary embodiment differs from the first exemplary embodiment by further including a first DC voltage converter C1 and an unidirectional current control element D1, both of which are disposed between the secondary battery 104 and the power transmission path 114. The first DC voltage converter C1 transmits power from the secondary battery 104, and supplies the varying load with demanded electric power via the load terminal 112. For example, in the case where an output voltage set value of the first DC voltage converter C1 is 44V, when an output voltage of the set of fuel cell stacks 102 is less than 44V, the secondary battery 104 provides auxiliary electric power via C1 to adjust a voltage value supplied from the set of fuel cell stacks 102 to the varying load to be not less than the output voltage set value of the first DC voltage converter C1. The unidirectional current control element D1 transmits the surplus electric power from the set of fuel cell stacks 102 to charge the secondary battery 104. The unidirectional current control element D1 is, for example, a diode element. Therefore, when a load power demand drops to cause the output voltage of the set of fuel cell stacks 102 to be greater than the output voltage of the secondary battery 104, the output power of the set of fuel cell stacks 102 charges the secondary battery 104 via D1, and thus the power (charge power) $P_{in}$ is greater than 0. Moreover, when a load voltage at the load terminal 112 is higher than a predetermined output voltage value of the first DC voltage converter C1, the first DC voltage converter C1 does not transmit the power from the secondary battery 104. The monitoring device in the exemplary embodiment is a device 502 for monitoring power input to a secondary battery. That is, the electrical parameter S is the power $P_{in}$ input to the secondary battery 104.

Figure 6:
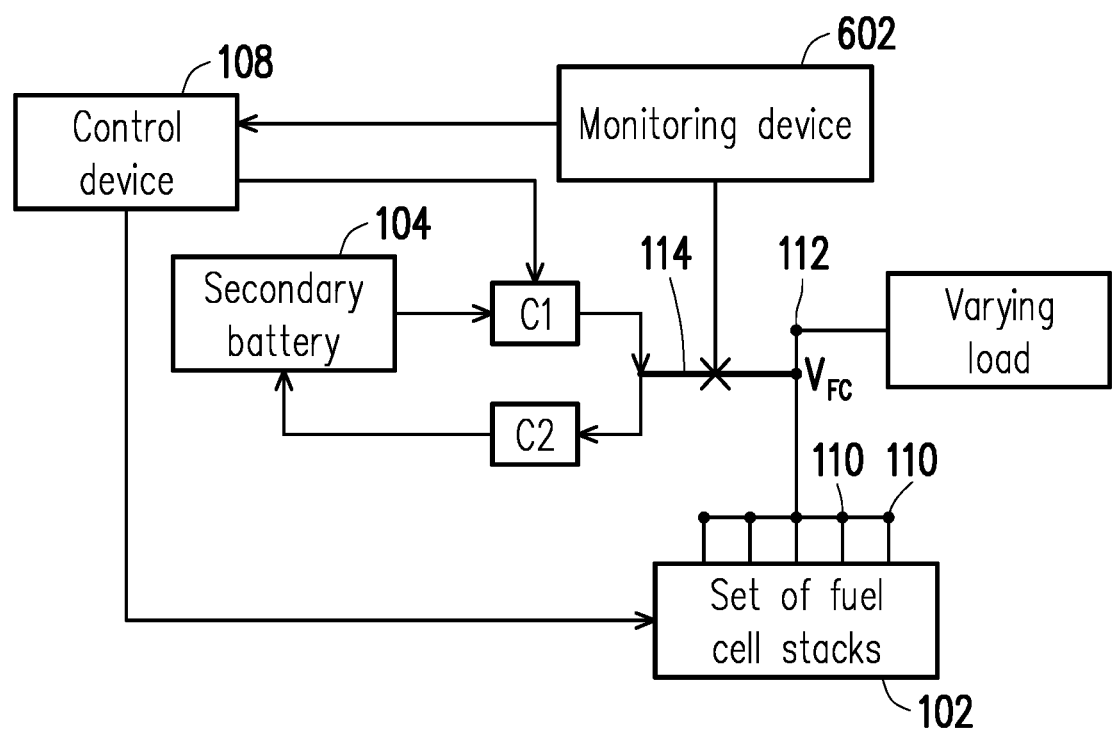
FIG. 6 is a block diagram of a control system of a fuel cell stack according to a fourth exemplary embodiment.

FIG. 6 is a block diagram of a control system of a fuel cell stack according to a fourth exemplary embodiment. The same reference numerals as those in the first exemplary embodiment denote the same or similar members, and the same or similar members can be understood with reference to the description of the first exemplary embodiment and will not be described again.

Referring to FIG. 6, a control system of a fuel cell stack according to the exemplary embodiment differs from the first exemplary embodiment by further including the first DC voltage converter C1 and a second DC voltage converter C2, both of which are disposed between the secondary battery 104 and the power transmission path 114. The first DC voltage converter C1 transmits the power from the secondary battery 104, and supplies the varying load with the demanded electric power via the load terminal 112. The second DC voltage converter C2 receives power from the set of fuel cell stacks 102, converts the power to a voltage level of the secondary battery 104, and charges the secondary battery 104. The monitoring device in the exemplary embodiment is a monitoring device 602 for monitoring the output voltage $V_{FC}$ of the set of fuel cell stacks 102. That is, the electrical parameter S is the terminal voltage $V_{FC}$ output by the set of fuel cell stacks 102 to the (varying) load. The predetermined upper limit $S_1$ is the output voltage upper limit $V_H$ of the set of fuel cell stacks 102, and the predetermined lower limit $S_2$ is the output voltage lower limit $V_L$ of the set of fuel cell stacks 102. For example, in the case where the electric power supplied by the set of fuel cell stacks 102 to the load ranges from 45V to 49.8V, the predetermined upper limit $S_1$ is the output voltage upper limit $V_H$ of the set of fuel cell stacks 102 and is equal to 49.8V, and the predetermined lower limit $S_2$ is the output voltage lower limit $V_L$ of the set of fuel cell stacks 102 and is equal to 45V. When the output voltage $V_{FC}$ of the set of fuel cell stacks 102 is greater than $V_H$, the output of at least one fuel cell stack of the set of fuel cell stacks 102 is shut down until all the fuel cells have been shut down. In contrast, when the output voltage $V_{FC}$ of the set of fuel cell stacks 102 is less than $V_L$, the output of at least one fuel cell stack of the set of fuel cell stacks 102 is started up until all the fuel cells have been started up.

In addition, the monitoring device 602 in the exemplary embodiment may simultaneously monitor the output voltage from the first DC voltage converter C1 and the input voltage transmitted to the second DC voltage converter C2 in the power transmission path 114. Assuming that a normal operating voltage of the secondary battery 104 is 42V to 50.4V, and a set value $V_{S1}$ of an output voltage (that is, voltage at the load terminal 112) of the entire system is 44V, once the output voltage $V_{FC}$ of the set of fuel cell stacks 102 is less than 44V, the secondary battery 104 provides the auxiliary electric power via the first DC voltage converter C1, so as to adjust the voltage value supplied from the set of fuel cell stacks 102 to the varying load to be not less than the set value $V_{S1}$ of the output voltage. When the load power demand drops to cause the output voltage $V_{FC}$ of the set of fuel cell stacks 102 to be greater than a predetermined input voltage value $V_{S2}$ (for example, 45.6V) of the second DC voltage converter C2, a part of a current output by the set of fuel cell stacks 102 charges the secondary battery 104 via the second DC voltage converter C2. In other words, the secondary battery 104 is neither charged nor discharged when the output voltage $V_{FC}$ is within a set voltage range (44V to 45.6V). When the load voltage at the load terminal 112 is higher than the set value $V_{S1}$, the first DC voltage converter C1 does not transmit the power from the secondary battery 104. In addition, a predetermined output voltage value $V_{S3}$ of the second DC voltage converter C2 is less than or equal to a highest charge voltage of the secondary battery 104. When an output voltage of the second DC voltage converter C2 is higher than the highest charge voltage, the second DC voltage converter C2 stops outputting the current to the secondary battery 104. The set value $V_{S1}$ is used as a voltage condition for the first DC voltage converter C1 to adjust discharging of the secondary battery 104. The predetermined input voltage value $V_{S2}$ or the predetermined output voltage value $V_{S3}$ is used as a voltage condition for the second DC voltage converter C2 to charge the secondary battery 104.

Figure 7:
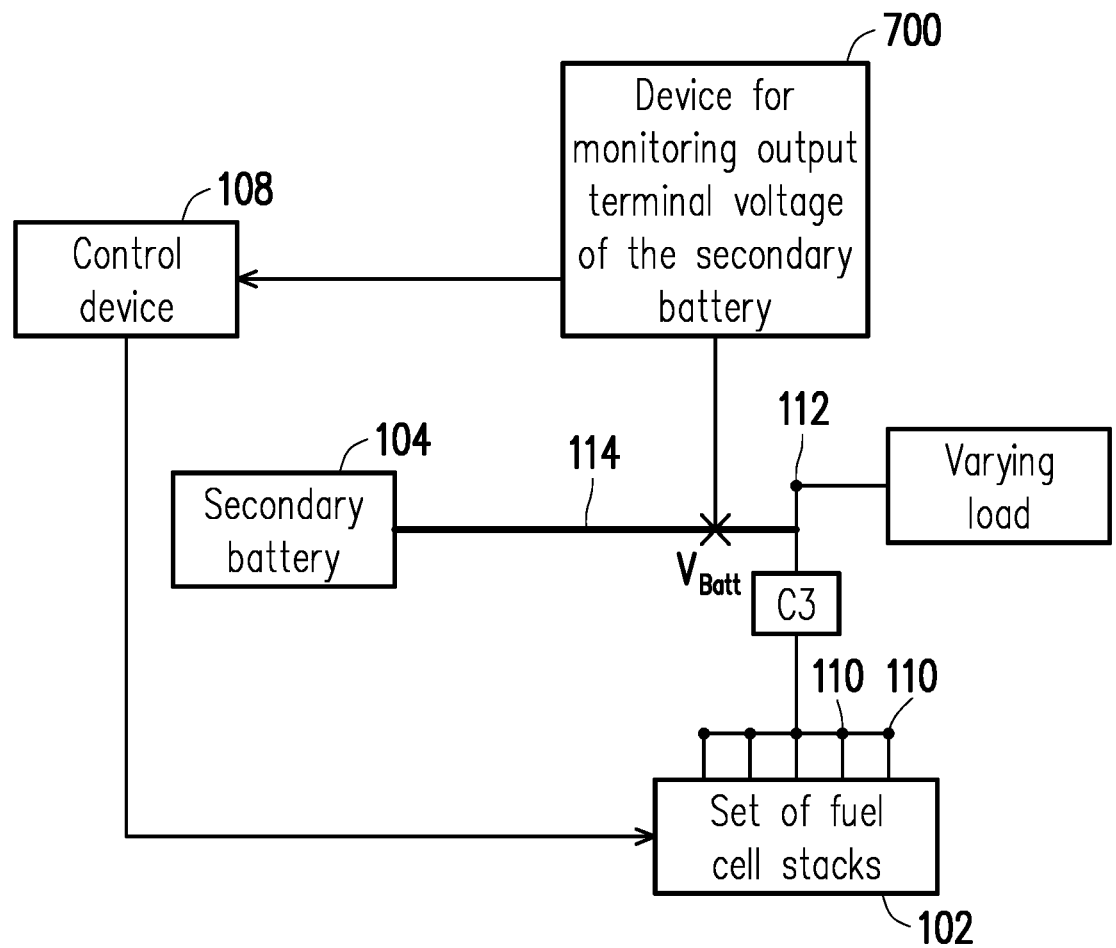
FIG. 7 is a block diagram of a control system of a fuel cell stack according to a fifth exemplary embodiment.

FIG. 7 is a block diagram of a control system of a fuel cell stack according to a fifth exemplary embodiment. The same reference numerals as those in the second exemplary embodiment (FIG. 4) denote the same or similar members, and the same or similar members can be understood with reference to the description of the second exemplary embodiment and will not be described again.

Referring to FIG. 7, the control system of a fuel cell stack according to the exemplary embodiment differs from the second exemplary embodiment in that a monitoring device is a device 700 for monitoring the output terminal voltage $V_{Batt}$ of the secondary battery 104. That is, the electrical parameter S is the terminal voltage $V_{Batt}$ output by the secondary battery 104 to the (varying) load. The predetermined upper limit $S_1$ is the terminal voltage upper limit $V_H$, and the predetermined lower limit $S_2$ is the terminal voltage lower limit $V_L$.

Figure 8:
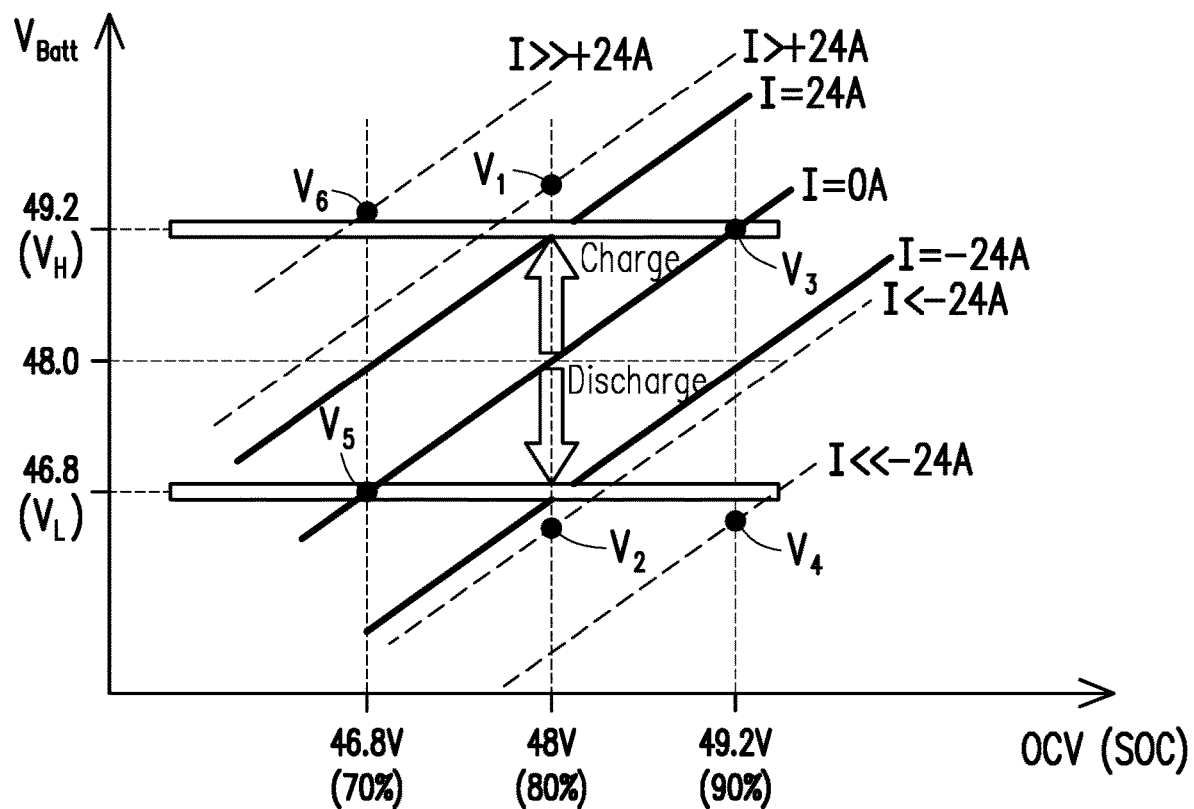
FIG. 8 is a curve diagram showing a relationship between the SOC of the fuel cell stack and an output terminal voltage $V_{Batt}$ according to the fifth exemplary embodiment.

In the exemplary embodiment, the number of fuel cells for power generation in the set of fuel cell stacks 102 is controlled based on the output terminal voltage $V_{Batt}$ of the secondary battery 104, and is therefore also affected by the state of charge (SOC) and charge and discharge current of the secondary battery 104. Referring to FIG. 8, it is assumed that the secondary battery 104 has a predetermined optimal charge and discharge voltage working range with the upper limit $V_H$ at 49.2V and the lower limit $V_L$ at 46.8V. In the case where the SOC of the secondary battery 104 is 80% (an open circuit voltage OCV is about 48V), when a recharge current I of the secondary battery 104 is equal to 24 A (I=+24 A), an output terminal voltage $V_1$ of the secondary battery 104 is equal to the terminal voltage upper limit $V_H$ (49.2V). Once the recharge current I is greater than 24 A (I>+24 A), the output terminal voltage $V_1$ is greater than the terminal voltage upper limit $V_H$, thereby triggering an operation of "shutting down the power output of at least one fuel cell stack of the set of fuel cell stacks." Similarly, when the discharge current I at this time exceeds/less than −24 A (I<−24 A), an output terminal voltage $V_2$ of the secondary battery 104 falls below the terminal voltage lower limit $V_L$ (46.8V), thereby triggering an operation of "starting up the power output of at least one fuel cell stack of the set of fuel cell stacks."

The higher the SOC of the secondary battery 104, the higher the open circuit voltage OCV. For example, in the case where the SOC of the secondary battery 104 is 90%, an output terminal voltage $V_3$ of the secondary battery 104 can be made equal to the terminal voltage upper limit $V_H$ without charging and discharging (I=0 A). Thus, the operation of "shutting down the power output of at least one fuel cell stack of the set of fuel cell stacks" is triggered. On the other hand, the discharge current must be much less than −24 A (I<<−24 A) to cause an output terminal voltage $V_4$ of the secondary battery 104 to be lower than $V_L$ (46.8V) and to trigger the operation of "starting up the power output of at least one fuel cell stack of the set of fuel cell stacks."

The lower the SOC of the secondary battery 104, the lower the open circuit voltage OCV. For example, in the case where the SOC of the secondary battery 104 is 70%, an output terminal voltage $V_5$ of the secondary battery 104 is equal to the terminal voltage lower limit $V_L$ without charging and discharging (I=0 A). Thus, the operation of "starting up the power output of at least one fuel cell stack of the set of fuel cell stacks" needs to be instantly triggered. On the other hand, if it is intended to trigger the operation of "shutting down the power output of at least one fuel cell stack of the set of fuel cell stacks," a recharge current much greater than 24 A (I>>+24 A) is required to cause an output terminal voltage $V_6$ of the secondary battery 104 to be greater than the terminal voltage upper limit $V_H$.

In summary, in the control system according to one exemplary embodiment, in response to a load variation, power generation of some of the fuel cell stacks connected in parallel can be instantly started up or shut down, such that the output voltage of the set of fuel cell stacks operating in parallel can be controlled within an expected specific range. Since the electrical parameter S of the power transmission path connecting the secondary battery to the set of fuel cell stacks is under monitoring, there is no need to monitor the state of the load or each fuel cell (stack). Particularly in a hybrid power supply system in which the secondary battery provides auxiliary electric power, the output power of the fuel cell stacks is controlled so that the discharge power or charge power of the secondary battery can be controlled within an appropriate range.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A control system of a fuel cell stack, comprising:
a set of fuel cell stacks, each fuel cell stack of the set of fuel cell stacks having a power output independently started up or shut down, and power output terminals of the set of fuel cell stacks being connected in parallel to a load terminal for power supply;
a secondary battery, connected to the power output terminals of the set of fuel cell stacks via a power transmission path;
a monitoring device, configured to monitor an electrical parameter of the power transmission path, wherein the electrical parameter is a power input to the secondary battery, a state of charge of the secondary battery, a terminal voltage output by the secondary battery to the load, an output voltage of the set of fuel cell stacks, an output terminal voltage of the secondary battery, or a current input to the secondary battery; and
a control device, receiving a signal of the electrical parameter from the monitoring device, outputting a first control signal to shut down the power output of at least one fuel cell stack of the set of fuel cell stacks in response to a value of the electrical parameter being higher than a predetermined upper limit, and outputting a second control signal to start up the power output of at least one fuel cell stack of the set of fuel cell stacks in response to the value of the electrical parameter being lower than a predetermined lower limit.

2. The control system of a fuel cell stack according to claim 1, wherein the electrical parameter is the power input to the secondary battery, the predetermined upper limit is a charge power upper limit, and the predetermined lower limit is a discharge power lower limit.

3. The control system of a fuel cell stack according to claim 2, wherein the monitoring device further comprises a state of charge estimation tool for the secondary battery that is configured to estimate a state of charge of the secondary battery, to lower the charge power upper limit in response to the state of charge being greater than a state of charge upper limit, and to raise the discharge power lower limit in response to the state of charge being less than a state of charge lower limit.

4. The control system of a fuel cell stack according to claim 1, wherein the electrical parameter is the state of charge of the secondary battery, the predetermined upper limit is a state of charge upper limit, and the predetermined lower limit is a state of charge lower limit.

5. The control system of a fuel cell stack according to claim 4, wherein the state of charge of the secondary battery is estimated from an output terminal voltage of the secondary battery in the power transmission path and a quantity of electricity entering and leaving the secondary battery via the power transmission path.

6. The control system of a fuel cell stack according to claim 4, wherein the state of charge of the secondary battery is determined based on an output terminal voltage of the secondary battery.

7. The control system of a fuel cell stack according to claim 1, further comprising a first DC voltage converter disposed between the secondary battery and the power transmission path and configured to transmit power from the secondary battery and supply a load with demanded electric power via the load terminal.

8. The control system of a fuel cell stack according to claim 7, wherein, in response to a load voltage at the load terminal being higher than a predetermined voltage value of the first DC voltage converter, the first DC voltage converter does not transmit the power from the secondary battery.

9. The control system of a fuel cell stack according to claim 7, further comprising an unidirectional current control element disposed between the secondary battery and the power transmission path and configured to transmit surplus electric power from the set of fuel cell stacks to charge the secondary battery.

10. The control system of a fuel cell stack according to claim 9, wherein the unidirectional current control element is a diode element.

11. The control system of a fuel cell stack according to claim 7, wherein the electrical parameter is the terminal voltage output by the secondary battery to the load via the first DC voltage converter, the predetermined upper limit is a terminal voltage upper limit, and the predetermined lower limit is a terminal voltage lower limit.

12. The control system of a fuel cell stack according to claim 7, further comprising a second DC voltage converter disposed between the secondary battery and the power transmission path and configured to receive power from the set of fuel cell stacks, convert the power to a voltage level of the secondary battery, and charge the secondary battery, wherein the electrical parameter is the output voltage of the set of fuel cell stacks, the predetermined upper limit is an output voltage upper limit of the set of fuel cell stacks, and the predetermined lower limit is an output voltage lower limit of the set of fuel cell stacks.

13. The control system of a fuel cell stack according to claim 12, wherein the second DC voltage converter has a predetermined input voltage value, and a part of a current of the set of fuel cell stacks charges the secondary battery via the second DC voltage converter in response to the output voltage of the set of fuel cell stacks being greater than the predetermined input voltage value.

14. The control system of a fuel cell stack according to claim 13, wherein the second DC voltage converter has a predetermined output voltage value less than or equal to a highest charge voltage of the secondary battery, and the second DC voltage converter stops outputting the current to the secondary battery in response to the output voltage of the second DC voltage converter being higher than the highest charge voltage.

15. The control system of a fuel cell stack according to claim 1, further comprising a third DC voltage converter disposed between the power output terminals of the set of fuel cell stacks and the load terminal, so as to output power to the load terminal via the third DC voltage converter.

16. The control system of a fuel cell stack according to claim 1, wherein the electrical parameter is the output terminal voltage of the secondary battery, the predetermined upper limit is a terminal voltage upper limit, and the predetermined lower limit is a terminal voltage lower limit.

17. The control system of a fuel cell stack according to claim 1, wherein the electrical parameter is the current input to the secondary battery, the predetermined upper limit is an input current upper limit, and the predetermined lower limit is an input current lower limit.

18. A control method of a fuel cell stack, configured to control a set of fuel cell stacks, wherein each fuel cell stack of the set of fuel cell stacks has a power output independently started up or shut down, and power output terminals of the set of fuel cell stacks are connected in parallel to a load terminal for power supply, the control method comprising:
    providing a secondary battery connected to the power output terminals of the set of fuel cell stacks via a power transmission path;
    monitoring an electrical parameter of the power transmission path by a monitoring device, wherein the electrical parameter is a power input to the secondary battery, a state of charge of the secondary battery, a terminal voltage output by the secondary battery to the load, an output voltage of the set of fuel cell stacks, an output terminal voltage of the secondary battery, or a current input to the secondary battery; and
    receiving the electrical parameter by a control device, and performing one of the following according to the electrical parameter by the control device:
        outputting a first control signal to shut down the power output of at least one fuel cell stack of the set of fuel cell stacks in response to a value of the electrical parameter being higher than a predetermined upper limit; and
        outputting a second control signal to start up the power output of at least one fuel cell stack of the set of fuel cell stacks in response to the value of the electrical parameter being lower than a predetermined lower limit.

19. The control method of a fuel cell stack according to claim 18, wherein the electrical parameter is the power input to the secondary battery, the predetermined upper limit is a charge power upper limit, and the predetermined lower limit is a discharge power lower limit.

20. The control method of a fuel cell stack according to claim 19, further comprising monitoring a state of charge of the secondary battery, lowering the charge power upper limit in response to the state of charge being greater than a state of charge upper limit, and raising the discharge power lower limit in response to the state of charge being less than a state of charge lower limit.

21. The control method of a fuel cell stack according to claim 18, wherein the electrical parameter is the state of charge of the secondary battery, the predetermined upper limit is a state of charge upper limit, and the predetermined lower limit is a state of charge lower limit.

22. The control method of a fuel cell stack according to claim 21, wherein the state of charge of the secondary battery is estimated from an output terminal voltage of the secondary battery in the power transmission path and a quantity of electricity entering and leaving the secondary battery via the power transmission path.

23. The control method of a fuel cell stack according to claim 21, wherein the state of charge of the secondary battery is determined based on an output terminal voltage of the secondary battery.

24. The control method of a fuel cell stack according to claim 18, further comprising providing a first DC voltage converter between the secondary battery and the power transmission path to transmit power from the secondary battery and supply a load with demanded electric power via the load terminal.

25. The control method of a fuel cell stack according to claim 24, comprising not transmitting the power from the secondary battery by the first DC voltage converter in response to an output voltage of the load connected to the load terminal being higher than a predetermined voltage value of the first DC voltage converter.

26. The control method of a fuel cell stack according to claim 24, further comprising providing an unidirectional current control element between the secondary battery and the power transmission path to transmit surplus electric power from the set of fuel cell stacks to charge the secondary battery.

27. The control method of a fuel cell stack according to claim 26, wherein the unidirectional current control element is a diode element.

28. The control method of a fuel cell stack according to claim 24, wherein the electrical parameter is the terminal voltage output by the secondary battery to the load via the first DC voltage converter, the predetermined upper limit is a terminal voltage upper limit, and the predetermined lower limit is a terminal voltage lower limit.

29. The control method of a fuel cell stack according to claim 24, further comprising providing a second DC voltage converter between the secondary battery and the power transmission path to receive power from the set of fuel cell stacks, convert the power to a voltage level of the secondary battery, and charge the secondary battery, wherein the electrical parameter is the output voltage of the set of fuel cell stacks, the predetermined upper limit is an output voltage upper limit of the set of fuel cell stacks, and the predetermined lower limit is an output voltage lower limit of the set of fuel cell stacks.

30. The control method of a fuel cell stack according to claim 29, wherein the second DC voltage converter has a predetermined input voltage value, and the control method comprises charging the secondary battery with a part of a current of the set of fuel cell stacks via the second DC voltage converter in response to the output voltage of the set of fuel cell stacks being greater than the predetermined input voltage value.

31. The control method of a fuel cell stack according to claim 30, wherein the second DC voltage converter has a predetermined output voltage value less than or equal to a highest charge voltage of the secondary battery, and the control method comprises stopping outputting the current to the secondary battery in response to the output voltage of the second DC voltage converter being higher than the highest charge voltage.

32. The control method of a fuel cell stack according to claim 18, wherein the electrical parameter is the current input to the secondary battery, the predetermined upper limit is an input current upper limit, and the predetermined lower limit is an input current lower limit.

33. The control method of a fuel cell stack according to claim 18, further comprising providing a third DC voltage converter between the power output terminals and the load terminal, so as to output power to the load terminal via the third DC voltage converter.

34. The control method of a fuel cell stack according to claim 18, wherein the electrical parameter is the output terminal voltage of the secondary battery, the predetermined upper limit is a terminal voltage upper limit, and the predetermined lower limit is a terminal voltage lower limit.

* * * * *